J. K. LOCKWOOD.
Circular-Saw.
No. 8,076. Reissued Feb. 5, 1878.
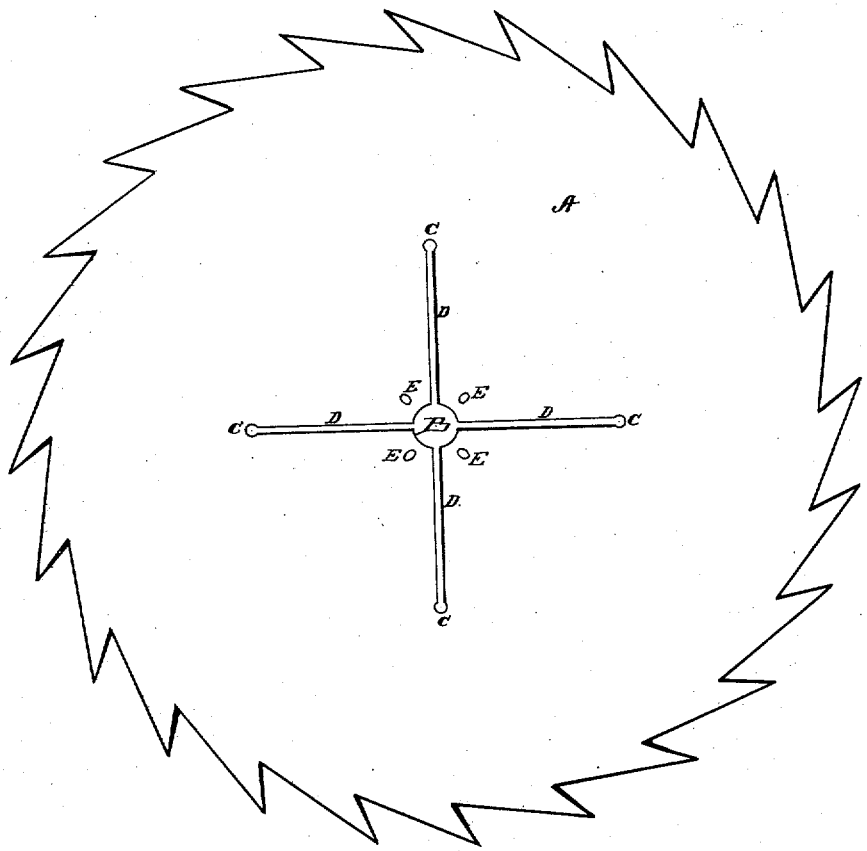
Witnesses
W R Eddin
Chas J. Gooch
Inventor.
James K Lockwood
By Knight Bros
attorneys
N. PETERS, PHOTO-LITHOGRAPHER, WASHINGTON, D. C.

UNITED STATES PATENT OFFICE.

JAMES K. LOCKWOOD, OF ALPENA, MICHIGAN.

IMPROVEMENT IN CIRCULAR SAWS.

Specification forming part of Letters Patent No. 70,728, dated November 12, 1867; Reissue No. 7,753, dated June 19, 1877; Reissue No. 8,076, dated February 5, 1878; application filed January 21, 1878.

*To all whom it may concern:*

Be it known that I, JAMES K. LOCKWOOD, of Alpena, in the county of Alpena and State of Michigan, have invented certain new and useful Improvements in Circular Saws, of which the following is a specification:

The object of my invention is to prevent the saw buckling or running unevenly by reason of unequal contraction or expansion of its parts under varying temperatures. To this end I construct a saw with a number of slits, slots, or openings near the center to permit free expansion and contraction.

The invention further consists in forming such slots or openings with enlargements at their ends to prevent cracking.

The invention further consists in constructing a slotted saw with bolt or dowel holes, of greater diameter than the bolts or dowels by which the saw is connected to the mandrel-collar.

In the drawings, A represents a circular saw, provided with the usual eye B, by means of which the saw is to be mounted on a suitable mandrel. From this eye B a series of slots, D, extend outward, varying in width according to the size and uses of the saw, and terminating at any desired point between the eye and the periphery. As in the rapid rotation of the saw it might occur that the saw would crack from the termination of these slots to the periphery, a series of circular holes, C, one at the termination of each slot, are punched in the saw to prevent such cracking.

E E are holes to receive dowel-pins, which pass from the permanent collar on the mandrel through the saw into the loose collar on the outside of the saw when hung. These holes being larger radially than the bolts or dowels, permit the expansion and contraction of the saw from the center. The eye B should be made a little larger than the mandrel upon which it is intended to run, to still further allow for contraction and expansion of the saw.

A saw constructed as above described will never become wavy in its motion, and will never buckle, as in heating and cooling the expansion and contraction will be taken up and neutralized by the radial slots. The enlarged holes and the enlargement of the eye through which the mandrel passes are also advantageous in affording freedom for expansion in radial lines.

What I claim as my invention, and desire to secure by Letters Patent, is—

1. A circular saw constructed with a series of cuts, slots, or openings in its inner or central portion, to prevent the warping or buckling of the saw when any part of it is expanded by heat.

2. A circular saw constructed with cuts, slots, or openings D, terminating in holes or enlargements C, substantially as and for the purposes set forth.

3. A circular saw constructed with cuts, slots, or openings, and with elongated bolt or dowel holes near the eye, substantially as and for the purposes set forth.

4. A circular saw constructed with cuts, slots, or openings, terminating in enlargements or circular openings C, and with enlarged bolt or dowel holes near the eye, substantially as and for the purposes set forth.

J. K. LOCKWOOD.

Witnesses:
J. D. TURNBULL,
FRED. H. BARLOW.